(12) United States Patent
Hasegawa et al.

(10) Patent No.: US 9,096,322 B2
(45) Date of Patent: Aug. 4, 2015

(54) VEHICLE SEAT

(71) Applicant: RECARO Aircraft Seating GmbH & Co. KG., Schwaebisch Hall (DE)

(72) Inventors: Satoshi Hasegawa, Untergruppenbach (DE); Djunianto Ko, Schwaebisch Hall (DE); Jochen Lohrmann, Waiblingen (DE); Juri Vnukovski, Pfedelbach (DE); Vasco Broenner, Michelfeld-Neunkirchen (DE); Timea Roderwald-Vincze, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 14/059,575

(22) Filed: Oct. 22, 2013

(65) Prior Publication Data
US 2014/0110981 A1    Apr. 24, 2014

(30) Foreign Application Priority Data
Oct. 24, 2012    (DE) .......................... 10 2012 020 846

(51) Int. Cl.
*A47C 15/00*    (2006.01)
*B64D 11/06*    (2006.01)
*B64D 11/00*    (2006.01)

(52) U.S. Cl.
CPC ............. *B64D 11/06* (2013.01); *B64D 11/0601* (2014.12); *B64D 11/0606* (2014.12); *B64D 11/0641* (2014.12); *B64D 11/00* (2013.01); *B64D 11/0604* (2014.12)

(58) Field of Classification Search
CPC .... B64D 11/00; B64D 11/06; B64D 11/0601; B64D 11/0604
USPC .......... 297/118, 63, 67, 243, 112, 232, 283.2, 297/233–236, 248, 188.08, 188.09, 423.1; 244/118.6; D6/357, 383
See application file for complete search history.

(56) References Cited

U.S. PATENT DOCUMENTS 7,318,622 B2 * 1/2008 Rezag et al. .................. 297/118
7,517,010 B2 * 4/2009 Saint-Jalmes et al. ........ 297/118

(Continued)

FOREIGN PATENT DOCUMENTS

DE    60220452 T2    1/2008
EP    0957025 A2    11/1999

(Continued)

OTHER PUBLICATIONS

German Search Report dated Jun. 16, 2013 issued in the corresponding DE patent application No. 10 2012 020 846.4 (with English translation).

*Primary Examiner* — Chi Q Nguyen
(74) *Attorney, Agent, or Firm* — Posz Law Group, PLC

(57) ABSTRACT

A vehicle seat, in particular an aircraft seat, has at least one seating device, which has at least one seat unit and at least one bench unit which is arranged at one side of the seat unit in a transverse direction oriented at least substantially perpendicular to a seat unit longitudinal direction and has a bench unit surface which forms a lying surface with at least one seat bottom unit of the seat unit in at least one seat position. The bench unit can have at least one cavity, which is provided in at least one seat position for accommodating the legs of a passenger sitting in a seating device arranged, in relation to the seat unit longitudinal direction, behind said seating device.

20 Claims, 3 Drawing Sheets

(56) References Cited

U.S. PATENT DOCUMENTS

| | | | |
|---|---|---|---|
| 7,997,531 B2 * | 8/2011 | Bettell | 244/118.6 |
| 8,011,723 B2 | 9/2011 | Park et al. | |
| 8,313,060 B2 * | 11/2012 | Darbyshire | 244/118.6 |
| D695,033 S * | 12/2013 | Salzberger et al. | D6/356 |
| 2008/0106131 A1 * | 5/2008 | Behrens | 297/232 |

FOREIGN PATENT DOCUMENTS

| | | |
|---|---|---|
| EP | 1495908 B1 | 5/2007 |
| WO | 2006/054104 A1 | 5/2006 |

* cited by examiner

VEHICLE SEAT

CROSS REFERENCE TO RELATED APPLICATION

This application is based on and incorporates herein by reference German Patent Application No. 10 2012 020 846.4 filed on Oct. 24, 2012.

PRIOR ART

The invention relates to a vehicle seat, in particular an aircraft seat.

A vehicle seat, in particular an aircraft seat, having at least one seating device, which has at least one seat unit and at least one bench unit which is arranged at one side of the seat unit in a transverse direction oriented at least substantially perpendicular to a seat unit longitudinal direction and has a bench unit surface which forms a lying surface with at least one seat bottom unit of the seat unit in at least one seat position, has already been proposed.

The object of the invention is, in particular, to provide a device of the type in question with improved properties as regards comfort for a passenger. According to the invention, the object is achieved by the features of Patent Claim 1, while advantageous embodiments and developments of the invention can be found in the subclaims.

ADVANTAGES OF THE INVENTION

The invention starts from a vehicle seat, in particular an aircraft seat, having at least one seating device, which has at least one seat unit and at least one bench unit which is arranged at one side of the seat unit in a transverse direction oriented at least substantially perpendicular to a seat unit longitudinal direction and has a bench unit surface which forms a lying surface with at least one seat bottom unit of the seat unit in at least one seat position.

It is proposed that the bench unit should have at least one cavity, which is provided in at least one seat position for accommodating the legs of a passenger sitting in a seating device arranged, in relation to the seat unit longitudinal direction, behind said seating device. The term "bench unit" is intended, in particular, to mean a unit which has at least one bench unit surface. In particular, the bench unit surface is designed as a seating surface. The bench unit surface is preferably designed as a lying surface. In particular, the bench unit is designed as a piece of side furniture for the seat unit. The bench unit surface is preferably arranged at least substantially in a plane defined by a seat bottom unit of the seat unit, in at least one seat position. In particular, the bench unit surface of the bench unit forms a lying surface together with the seat bottom unit of the seat unit in at least one seat position of the seat unit. The bench unit is preferably provided for use as a deposition surface, e.g. for hand luggage and/or clothing of a passenger sitting on the seat unit. In particular, the bench unit surface of the bench unit is provided for use as a seating surface for a child accompanying the passenger sitting on the seat unit. The term "side" of the seat unit is intended, in particular, to mean a region of the seat unit which forms a boundary of the seat unit. The phrase stating that the bench unit surface is "arranged at least substantially in a plane defined by a seat bottom unit of the seat unit", in at least one seat position, is intended, in particular, to mean that more than 90%, preferably more than 93%, and, in particular, more than 95% of the bench unit surface is arranged in the plane defined by the seat bottom unit of the seat unit. The phrase stating that a straight line and/or a plane is oriented "at least substantially perpendicular" to a further straight line and/or plane formed separately from the first straight line and/or plane is intended, in particular, to mean that the straight line and/or plane encloses an angle with the further straight line and/or plane which deviates by less than 15°, preferably by less than 10°, and, in particular, by less than 5° from an angle of 90°. The term "seat unit longitudinal direction" is intended, in particular, to mean a direction which is oriented at least substantially parallel to a sitting direction. The term "sitting direction" is intended, in particular, to mean a direction which corresponds substantially to the direction in which the thighs of a passenger extend from the buttocks to the knee area when said passenger is sitting properly, in particular when the thighs of the passenger are oriented in parallel. In an upright position of a seat unit, in which a backrest unit is oriented at least substantially perpendicular to a floor, the sitting direction is parallel to the floor and oriented at least substantially perpendicular to the backrest surface formed by the backrest unit. If the seating device is used for an aircraft passenger seat, the sitting direction typically corresponds to the direction of flight. The phrase stating that a straight line and/or plane is oriented "at least substantially parallel" to a further straight line and/or plane formed separately from the first straight line and/or plane is intended, in particular, to mean that the straight line and/or plane encloses an angle with the further straight line and/or plane which deviates by less than 10°, preferably by less than 5°, and, in particular, by less than 2° from an angle of 0°. The term "cavity" is intended, in particular, to mean a space which is bounded by at least one component, in particular by at least one bench unit, in particular by at least three and preferably by at least four sides. In particular, the cavity has a cavity volume which is bounded by the component at the sides. The cavity is preferably accessible via at least one opening. In particular, the cavity is provided for accommodating the legs of a passenger sitting in a seating device arranged, in relation to the seat unit longitudinal direction, behind said seating device. The cavity is preferably provided for accommodating objects, in particular hand luggage, clothing and/or shoes, of a passenger sitting on a seating device arranged behind said seating device. The word "provided" is intended, in particular, to mean specifically designed and/or equipped. By means of an embodiment according to the invention, it is advantageously possible to provide a vehicle seat having as much room as possible for a passenger, in particular even when the seats are placed close together in a passenger cabin in which the vehicle seat is arranged, thereby making it possible to increase comfort for the passenger. Moreover, it is advantageously possible to use a vehicle seat flexibly as a seating surface, as a lying surface and/or as a deposition surface. It is furthermore advantageously possible to make available a storage space for the passenger sitting on the seating device arranged, in relation to the seat unit longitudinal direction, behind said seating device.

It is furthermore proposed that the seating device be provided for installation in a passenger cabin with a seat unit longitudinal direction oriented inclined to a passenger cabin longitudinal direction. In particular, the seating device has at least one fitting body, which is provided for fastening the seating device in the passenger cabin. The passenger cabin preferably has at least one fastening rail, which is provided for at least partially accommodating the fitting body in the installed state of the seating device. In particular, the fastening rail is anchored at least substantially in a fixed manner in the passenger cabin. The seating device is preferably provided for installation in the passenger cabin by means of the fitting body, in particular in the passenger cabin by means of the fastening rail. In particular, the fastening rail is oriented at least substantially parallel to the passenger cabin longitudinal direction. The fitting body preferably has a fitting body longitudinal direction which is oriented inclined to the seat unit, in particular to a seat bottom unit of the seat unit. In particular, the fitting body longitudinal direction is oriented inclined to the seat unit longitudinal direction, in particular to a seat bottom unit longitudinal direction of the seat bottom unit. The fitting body longitudinal direction is preferably oriented, at least substantially parallel to the passenger cabin longitudinal direction. In particular, the fitting body longitudinal direction is oriented at least substantially parallel to at least one fastening rail longitudinal direction of the fastening rail. In particular, an angle, in particular a smallest angle, between the seat unit longitudinal direction and the passenger cabin longitudinal direction is at least substantially 30°. In particular, the seating device has a seating device longitudinal direction which encloses an angle, in particular a smallest angle, of at least substantially 60° with the seat unit longitudinal direction. The seating device longitudinal direction preferably encloses an angle, in particular a smallest angle, of at least substantially 30° with the passenger cabin longitudinal direction. In particular, the seating device longitudinal direction is oriented at least substantially parallel to a lying surface longitudinal direction. The term "smallest angle" is intended, in particular, to mean an angle at an intersection between two straight lines, having a magnitude which is smaller or equal to a magnitude of a largest angle at the intersection between the two straight lines. In particular, a sum of the smallest angle and the largest angle is at least substantially 180°. In, this context, the phrase "at least substantially" is intended, in particular, to mean that a deviation from a predetermined value is, in particular, less than 25%, preferably less than 10%, and particularly preferably less than 5% of the predetermined value. By means of an embodiment according to the invention, it is advantageously possible to achieve maximum seat density for a vehicle seat according to the invention in a passenger cabin in which the vehicle seat is arranged while simultaneously achieving as comfortable as possible and large a space for a passenger sitting on the vehicle seat. It is furthermore advantageously possible to ensure that a passenger sitting on the seating device has direct access to a passenger cabin aisle, irrespective of a position of the seating device in the passenger cabin.

It is furthermore proposed that the seating device have at least one further bench unit, which is formed separately from said bench unit and is arranged at a side of the seat unit arranged separately from the first side in relation to the transverse direction. By means of an embodiment according to the invention, it is advantageously possible to make available a further bench unit to a passenger sitting on the vehicle seat, thereby making it possible to increase the space available to the passenger.

It is furthermore proposed that the further bench unit have a bench unit surface which forms the lying surface with the seat bottom unit of the seat unit and with the bench unit surface of the bench unit in at least one seat position. In particular, the bench unit surface of the further bench unit is arranged at least substantially in the plane defined by the seat bottom unit of the seat unit in said seat position. By means of an embodiment according to the invention, it is advantageously possible to make available a large lying surface, on which a passenger sitting on the vehicle seat can lie down in a pleasant and comfortable manner.

It is furthermore proposed that the bench unit have a bench unit longitudinal extent which is at least substantially the same as a seat unit longitudinal extent of the seat unit in at least one seat position. In particular, the bench unit is arranged in such a way in relation to the transverse direction at one side of the seat unit that, in said seat position, in particular when viewed in relation to a bench unit longitudinal direction, a bench unit front region, in particular a front edge, of the bench unit is arranged flush with a seat unit front region, in particular with a front edge, of the seat unit in a contact region with the seat unit, in particular when viewed in relation to the seat unit longitudinal direction. The phrase stating that the bench unit longitudinal extent is "at least substantially the same" as a seat unit longitudinal extent of the seat unit in at least one seat position is intended, in particular, to mean that a magnitude of the bench unit longitudinal extent of the bench unit differs from a magnitude of the seat unit longitudinal extent of the seat unit by less than 10%, preferably by less than 5%, and, in particular, by less than 3%. By means of an embodiment according to the invention, it is advantageously possible to achieve flush arrangement of the seat unit and of the bench unit, thereby making it possible to avoid edges and corners and hence to reduce a risk of injury to a passenger.

Moreover, it is proposed that the seat unit have at least one lower leg support unit and the at least one seat bottom unit, which are arranged at least substantially in one plane in at least one seat position. The phrase stating that the lower leg support unit and the seat bottom unit are "arranged at least substantially in one plane" in at least one seat position is intended, in particular, to mean that the lower leg support unit has a lower leg support unit surface, more than 90%, preferably more than 93%, and, in particular, more than 95%, of which is arranged in a plane defined by the seat bottom unit. By virtue of an embodiment according to the invention, it is advantageously possible, in said seat position, for a passenger sitting on the seat bottom unit of the seat unit to rest his legs on the lower leg support unit of the seat unit with his leas comfortably stretched out.

It is furthermore proposed that the further bench unit have a bench unit longitudinal extent which is at least substantially the same as a seat unit longitudinal extent of the seat unit in the seat position in which the lower leg support unit and the seat bottom unit are arranged at least substantially in said plane. In particular, the further bench unit is arranged in such a way in relation to the transverse direction at one side of the seat unit that, in said seat position, in particular when viewed in relation to a bench unit longitudinal direction, a bench unit front region, in particular a front edge, of the bench unit is arranged flush with a seat unit front region, in particular with a front edge, of the seat unit in a contact region with the seat unit, in particular when viewed in relation to the seat unit longitudinal direction. The phrase stating that the bench unit longitudinal extent is "at least substantially the same" as a seat unit longitudinal extent of the seat unit in said seat position is intended, in particular, to mean that a magnitude of the bench unit longitudinal extent of the further bench unit differs from a magnitude of the seat unit longitudinal extent of the seat unit by less than 10%, preferably by less than 5%, and, in particular, by less than 3%. By means of an embodiment according to the invention, it is advantageously possible to achieve flush arrangement of the seat unit and of the bench unit, thereby making it possible to avoid edges and corners and hence to reduce a risk of injury to passenger.

It is furthermore proposed that the seat unit have at least two different transverse extents in the transverse direction. As an alternative, it is conceivable that the seat unit should have an at least substantially constant transverse extent in the transverse direction. By means of an embodiment according to the invention, it is advantageously possible for the seat unit to have a larger transverse extent in relation to the transverse direction in a region of significance for a passenger sitting in the seat unit, as a result of which the passenger has more space available in which to make himself comfortable.

Moreover, it is proposed that the seating device have at least one partition wall, which has an at least substantially undulating contour in at least one cross sectional plane. As an alternative, it is conceivable for the partition wall to have an at least substantially straight contour, in particular a contour designed at least substantially as a straight line. In particular, the partition wall is arranged on an extension of the backrest unit. The term "partition wall" is intended, in particular, to mean a wall which is provided to allow screening, in particular screening relative to other vehicle seats, in at least one installed state. In particular, the partition wall is provided for delimiting a region at the disposal of a passenger. The partition wall is preferably provided for protecting a private sphere of the passenger using the vehicle seat, in particular from the view of other passengers using vehicle seats adjacent to said vehicle seat. The term "undulating contour" is intended, in particular, to mean a contour which can be described by a mathematical sine function given by $f(x)=a\ sin(bx)$. In particular, the factor a modifies an amplitude of the mathematical sine function. The factor b preferably modifies a period length, in particular a frequency, of the mathematical sine function. In particular, the factors a and b are real numbers greater than zero. The phrase "at least substantially undulating contour" is intended, in particular, to mean a contour which deviates from the mathematical sine function $f(x)=a\ sin(bx)$ in a direction at least substantially parallel to an amplitude of the mathematical sine function $f(x)=a\ sin(bx)$ by less than 10%, preferably by less than 7%, and, in particular, by less than 5% of a magnitude of the amplitude of 2a of the mathematical sine function $f(x)=a\ sin(bx)$ and which deviates from the mathematical sine function $f(x)=a\ sin(bx)$ in a direction at least substantially parallel to a period length of the mathematical sine function $f(x)=a\ sin(bx)$ by less than 10%, preferably by less than 7%, and, in particular, by less than 5% of a magnitude of the period length of $2\pi/b$ of the mathematical sine function $f(x)=a\ sin(bx)$. By means of an embodiment according to the invention, it is advantageously possible to screen off a region of the vehicle seat, thereby making it possible to protect a private sphere of a passenger using the vehicle seat in a simple and reliable manner.

It is furthermore proposed that the bench unit have at least one bench unit region which is oriented at least substantially parallel to a backrest unit of the seat unit in at least one seat position. In particular, the bench unit region is arranged as an extension of the backrest unit. In particular, the further bench unit has at least one bench unit region which is oriented at least substantially parallel to the backrest unit of the seat unit in at least one seat position. Each of the bench units preferably has at least one bench unit region which is oriented at least substantially parallel to the backrest unit of the seat unit in at least one seat position. In particular, the bench unit region in said seat position extends over at least 25% of an extent of the backrest unit of the seat unit in said seat position. The bench unit region in said seat position is preferably oriented at least substantially parallel to the backrest unit of the seat unit over at least 25% of the extent of the backrest unit of the seat unit. In particular, a magnitude of a surface of the bench unit region is greater than 10%, preferably greater than 15%, and, in particular, greater than 20%, of a magnitude of a backrest surface of the backrest unit of the seat unit. The seat unit, in particular the backrest unit, is preferably arranged in an upright seat position in said seat position. In particular, the backrest unit has the extent which is oriented at least substantially perpendicular to the seat bottom unit of the seat unit, in particular to a bottom, in said seat position. By means of an embodiment according to the invention, it is advantageously possible to use the bench unit region of the bench unit as a comfortable supporting surface for a passenger using the bench unit, in particular for a back of the passenger using the bench unit.

Moreover, it is proposed that the seat unit comprise at least one backrest unit, which comprises at least one side guide member. The term "side guide member" is intended, in particular, to mean an element which is arranged at one side of the backrest unit in relation to the transverse direction in at least one upright seat position of the seat unit, in which the backrest unit is oriented at least substantially perpendicular to the seat bottom unit, in particular to a floor. In particular, the side guide member is provided for making available a lateral bearing surface for a back of a passenger sitting in the seat unit, in particular a shoulder region of the back of the passenger. In particular, the side guide member is provided for forming a lateral boundary of the backrest unit. The side guide member is preferably arranged at one side of the backrest unit in relation to a transverse direction, wherein a plane formed by at least a large part of a surface of the side guide member encloses an angle of more than 10° with a plane formed by at least a large part of a backrest surface of the backrest unit and an angle of less than 80° with the seat unit longitudinal direction. By means of an embodiment according to the invention, it is advantageously possible for the seat unit to make available comfortable lateral retention to a passenger sitting in the seat unit.

A system having at least one vehicle seat according to the invention and having at least one further seat arranged behind said vehicle seat in relation to the seat unit longitudinal direction, in particular having at least one further vehicle seat according to the invention arranged behind said vehicle seat in relation to the seat unit longitudinal direction, is furthermore proposed. By means of an embodiment according to the invention, it is advantageously possible to achieve a comfortable arrangement of the further seat for a passenger sitting in the further seat in relation to the vehicle seat arranged in front of the further seat in relation to the seat unit longitudinal direction.

A passenger cabin, in particular an aircraft passenger cabin, having at least one vehicle seat according to the invention is furthermore proposed. By means of an embodiment according to the invention, it is advantageously possible to fit a passenger cabin with at least one vehicle seat according to the invention, thereby making it possible to achieve a comfortable passenger cabin.

Moreover, it is proposed that the seating device be installed in the passenger cabin with a seat unit longitudinal direction oriented inclined to the passenger cabin longitudinal direction. By means of an embodiment according to the invention, it is advantageously possible to achieve maximum seat density for a vehicle seat according to the invention in a passenger cabin in which the vehicle seat is arranged while simultaneously achieving as comfortable as possible and large a space for a passenger sitting on the vehicle seat. It is furthermore advantageously possible to ensure that a passenger sitting on the seating device has direct access to a passenger cabin aisle, irrespective of a position of the seating device in the passenger cabin.

DRAWINGS

Further advantages will become apparent from the following description of the drawings. In the drawings, an illustrative embodiment of the invention is shown. The drawings, the description and the claims contain numerous features in combination. A person skilled in the art will expediently also consider the features individually and combine them into worthwhile further combinations.

DESCRIPTION OF THE ILLUSTRATIVE EMBODIMENT

Figure 1:
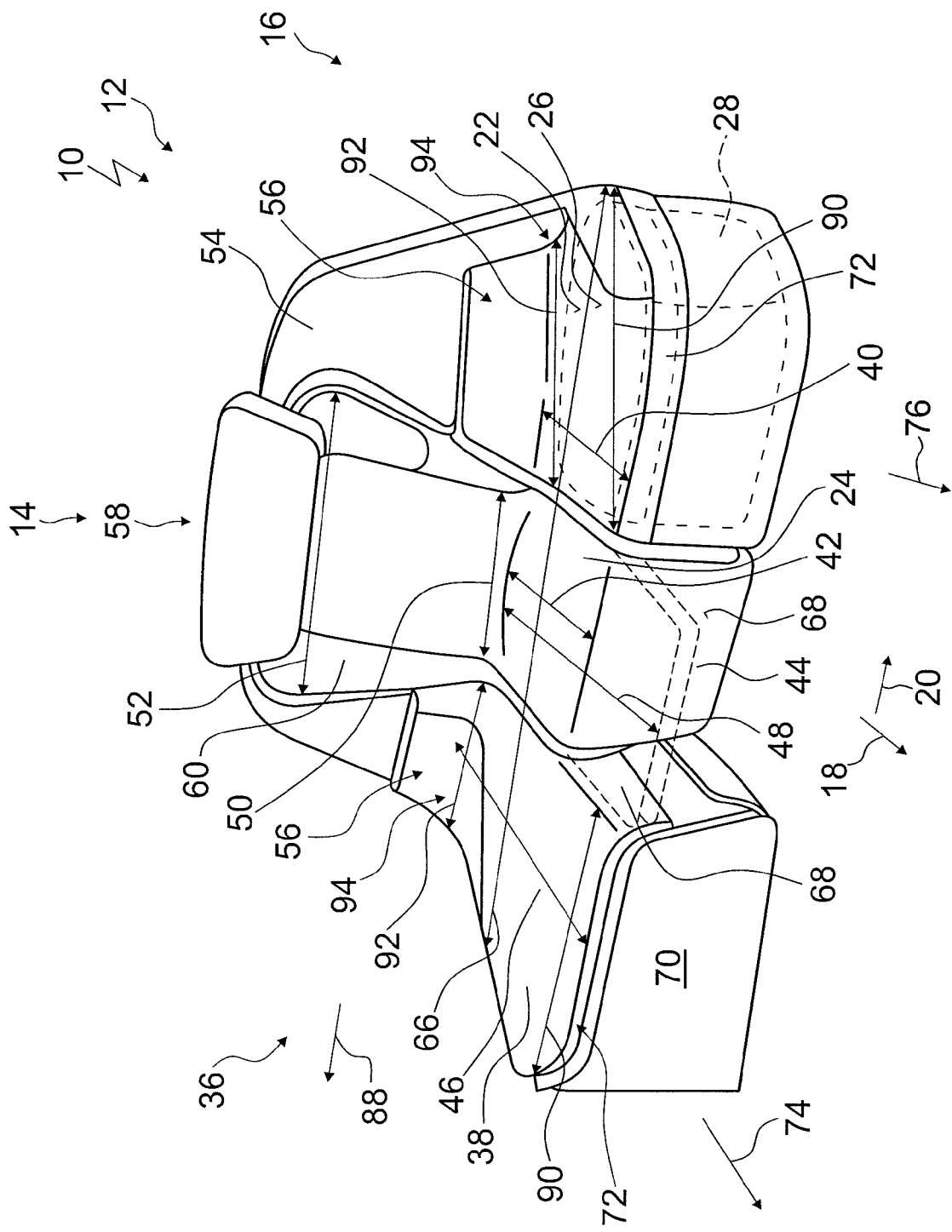
FIG. 1 shows a vehicle seat according to the invention in a perspective view.

FIG. 1 shows a vehicle seat 10, namely an aircraft seat, having a seating device 12, which has a seat unit 14 and a bench unit 16, which is arranged in a transverse direction 20 oriented perpendicular to a seat unit longitudinal direction 18 at one side of the seat unit 14 and has a bench unit surface 22 which forms a lying surface 26 with a seat bottom unit 24 of the seat unit 14 in one seat position. As can furthermore be seen from FIG. 1, the seating device 12 has a further bench unit 36, which is formed separately from said bench unit 16 and is arranged at a side of the seat unit 14 arranged separately from the first side in relation to the transverse direction 20. The seat unit 14 is arranged between the bench unit 16 and the further bench unit 36 in relation to the transverse direction 20. As a result, a passenger sitting on the seating device 12 (cf. FIG. 2) has an advantageously large space available. The seating device 12 has a partition wall 54, which has an undulating contour in a cross-sectional plane (cf. also FIG. 3).

The seat unit 14 has a lower leg support unit 44, which is pivotably mounted on the seat bottom unit 24 of the seat unit 14. Moreover, the seat unit 14 has a backrest unit 58, which comprises two side guide members 60. The side guide members 60 of the backrest unit 58 are arranged in a region of the backrest unit 58 remote from the seat bottom unit 24. The side guide members 60 of the backrest unit 58 are furthermore arranged on each side of the backrest unit 58 in relation to the transverse direction 20. In the transverse direction 20, the backrest unit 58 has a multiplicity of different transverse extents 50, 52.

Since the seat unit 14 has the backrest unit 58, the seat unit 14 has the multiplicity of different transverse extents 50, 52 in the transverse direction 20. Only two extreme cases of the multiplicity of different transverse extents 50, 52 will be considered below. A region of the backrest unit 58 adjacent to the seat bottom unit 24 of the seat unit 14 has the transverse extent 50. The region of the backrest unit 58 remote from the seat bottom unit 24 of the seat unit 14 has the transverse extent 52. Transverse extent 50 is less than transverse extent 52. Starting from the region of the backrest unit 58 remote from the seat bottom unit 24 of the seat unit 14, the backrest unit 58 has a tapering profile in the direction of the region of the backrest unit 58 adjacent to the seat bottom unit 24 of the seat unit 14.

The further bench unit 36 has a bench unit surface 38 which forms the lying surface 26 with the seat bottom unit 24 of the seat unit 14 and with the bench unit surface 22 of the bench unit 16 in said seat position. As a result, the passenger sitting on the seating device 12 can lie down comfortably on the seating device 12. The lying surface 26 has a lying surface longitudinal extent 66 which is oriented inclined to the seat unit longitudinal direction 18. A passenger lying on the lying surface 26 of the seating device 12 (cf. FIG. 2) lies inclined to the seat unit longitudinal direction 18.

The seat unit 14 has the lower leg support unit 44 and the seat bottom unit 24, which are arranged in one plane in one seat position. The lower leg support unit 44 has a lower leg support unit surface 68 which is arranged in the plane defined by the seat bottom unit 24 in said seat position. The further bench unit 36 has a bench unit longitudinal extent 46 which is the same as a seat unit longitudinal extent 48 of the seat unit 14 in the seat position in which the lower leg support unit 44 and the seat bottom unit 24 are arranged in said plane. By means of such an embodiment according to the invention, it is advantageously possible to extend the lying surface 26 by means of the lower leg support unit surface 68. As a result, an even larger lying surface 26 can advantageously be made available to the passenger lying on the lying surface 26. Moreover, the passenger can adjust the lying surface 26 according to requirements by virtue of the pivotable support of the lower leg support unit 44 on the seat bottom unit 24.

Moreover, FIG. 1 shows that the further bench unit 36 has a multiplicity of different bench unit transverse extents 90, 92. Only two extreme cases of the multiplicity of different bench unit transverse extents 90, 92 will be considered below. A bench unit front region 72 when viewed in relation to a bench unit longitudinal direction 74 oriented parallel to the bench unit longitudinal extent 46, starting from the bench unit surface 38, has the bench unit transverse extent 90. A bench unit rear region 94 when viewed in relation to the bench unit longitudinal direction 74, starting from the bench unit surface 38, said rear region being adjacent to the bench unit region 56, has the bench unit transverse extent 92. The bench unit transverse extent 92 is smaller than the bench unit transverse extent 90. Starting from the bench unit front region 72, the further bench unit 36 has a profile which tapers counter to the bench unit longitudinal direction 74.

Similarly, bench unit 16 has a multiplicity of different bench unit transverse extents 90, 92. Only two extreme cases of the multiplicity of different bench unit transverse extents 90, 92 will be considered below. A bench unit front region 72 when viewed in relation to a bench unit longitudinal direction 76 oriented parallel to a bench unit longitudinal extent 40, starting from the bench unit surface 22, has the bench unit transverse extent 90. A bench unit rear region 94 in relation to the bench unit longitudinal direction 76, starting from the bench unit surface 22, said region being adjacent to the bench unit region 56, has the bench unit transverse extent 92. Bench unit transverse extent 92 is smaller than bench unit transverse extent 90. Starting from the bench unit front region 72, bench unit 16 has a profile which tapers counter to the bench unit longitudinal direction 76.

FIG. 1 furthermore shows that the further bench unit 36 has a cavity 70, which is provided for storing useful objects belonging to the passenger sitting on the seating device 12. The useful objects can take the form of hand luggage, shoes, clothing, food and/or multimedia objects, such as laptops and/or headphones, for example. The cavity 70 is accessible at the bench unit front region 72 of the further bench unit 36 in relation to the bench unit longitudinal direction 74 oriented parallel to the bench unit longitudinal extent 46, starting from the bench unit surface 38. More specifically, the cavity 70 has an opening in the bench unit front region 72 of the bench unit 36, through which opening the cavity 70 is accessible. The further bench unit 36 has the bench unit region 56, which is oriented parallel to a backrest unit 58 of the seat unit 14 in one seat position.

Similarly, the bench unit 16 has the bench unit region 56, which is oriented parallel to a backrest unit 58 of the seat unit 14 in one seat position. Accordingly, each of the bench units 16, 36 has the bench unit region 56, which is oriented parallel to the backrest unit 58 of the seat unit 14 in one seat position. The bench unit 16 has the bench unit longitudinal extent 40, which is the same as a seat unit longitudinal extent 42 of the seat unit 14 in one seat position. In the seat position in which the bench unit longitudinal extent 40 is the same as the seat unit longitudinal extent 42 of the seat unit 14, the lower leg support unit 44 is arranged in a position attached pivotally to the seat unit 14. Thus, the lower leg support unit surface 68 encloses an angle of about 90° with the lying surface 26 in said seat position.

Figure 2:
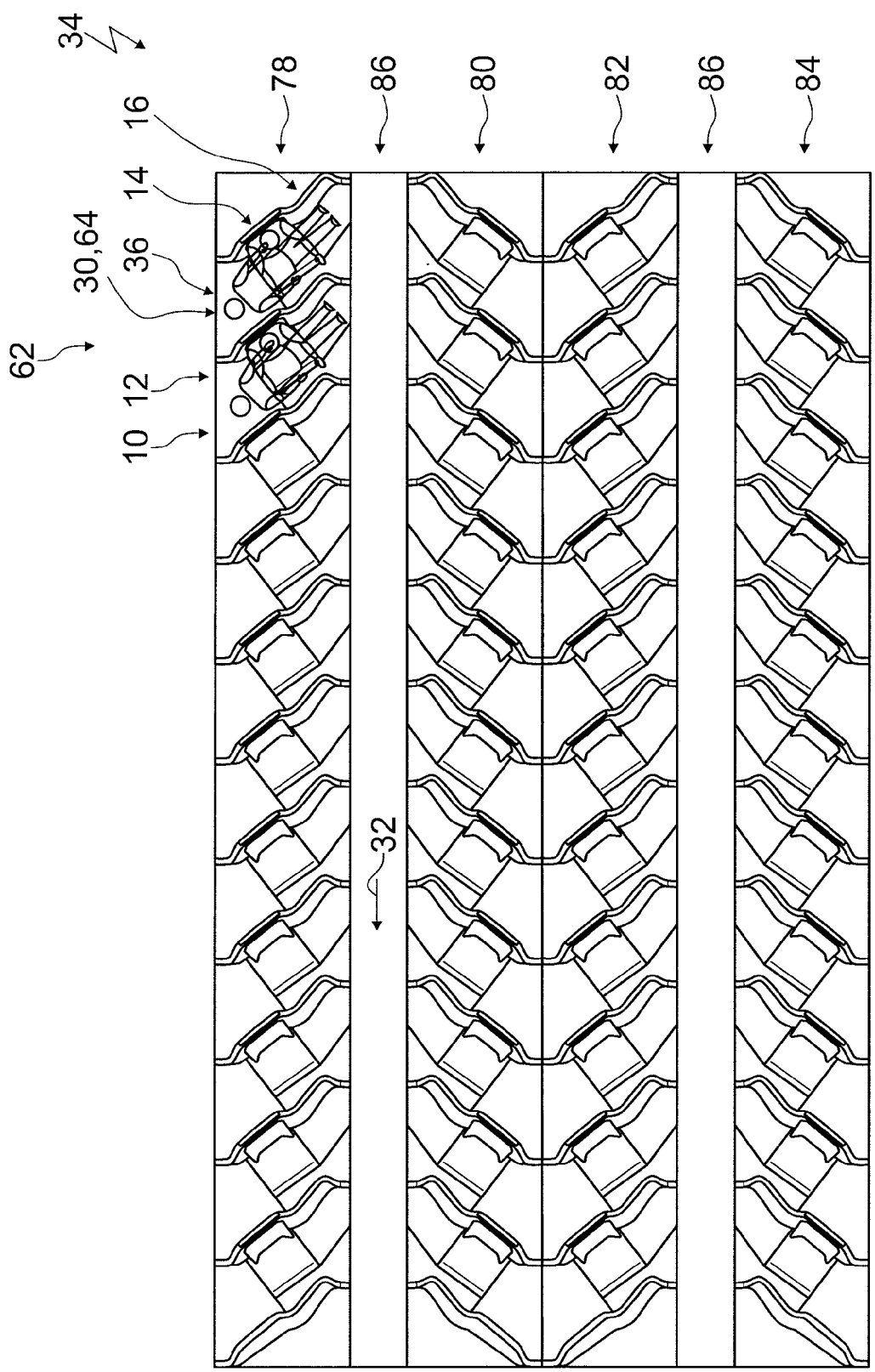
FIG. 2 shows a passenger cabin according to the invention with a multiplicity of vehicle seats according to the invention as shown in FIG. 1.
Figure 3:
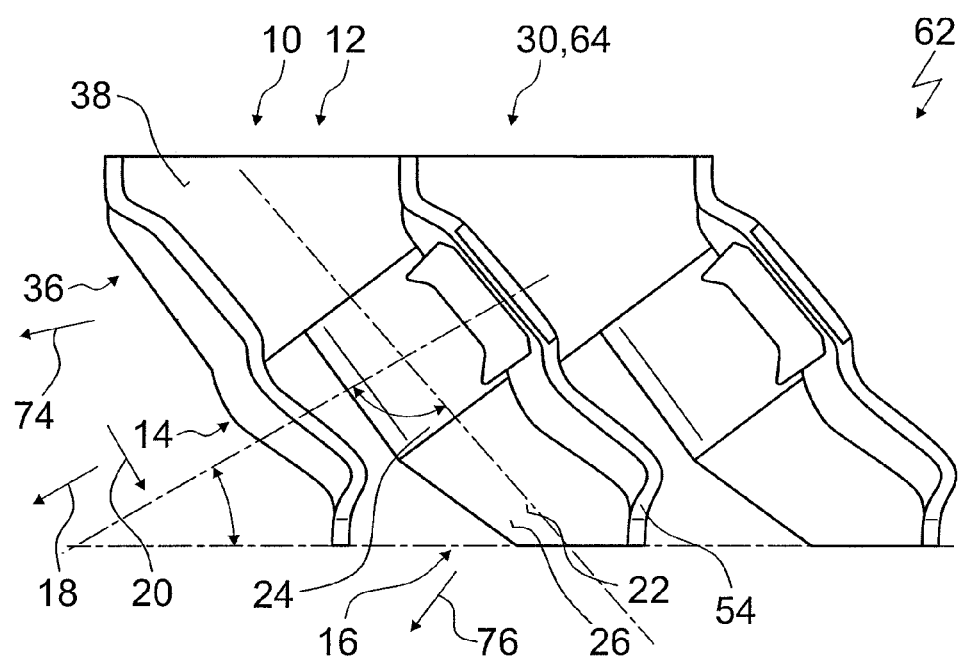
FIG. 3 shows an enlarged detail of FIG. 2.

The bench unit 16 has a cavity 28 which is provided in one seat position for accommodating the legs of a passenger sitting in a seating device 30 arranged behind seating device 12 in relation to the seat unit longitudinal direction 18 (cf. FIGS. 2 and 3). For the sake of clarity, the cavity 28 is shown only in FIG. 1. In FIG. 1, the cavity 28 is shown in dashed lines since the cavity 28 is arranged within the bench unit 16. Starting from the bench unit surface 22 of the bench unit 16, an opening of the cavity 28 is arranged behind the bench unit 16 in relation to the bench unit longitudinal direction 76 oriented parallel to the bench unit longitudinal extent 40.

The seating device 12 is provided for installation in a passenger cabin 34 with a seat unit longitudinal direction 18 oriented inclined to a passenger cabin longitudinal direction 32. In the present illustrative embodiment, the seating device 12 is installed in the passenger cabin 34 with a seat unit longitudinal direction 18 oriented inclined to a passenger cabin longitudinal direction 32.

FIG. 2 shows the passenger cabin 34 according to the invention, more specifically an aircraft passenger cabin, having a multiplicity of vehicle seats 10 according to the invention. For the sake of clarity, only one of the vehicle seats 10 is provided with reference signs in FIGS. 2 and 3. For the sake of clarity, there is furthermore no detailed illustration of the vehicle seats 10 according to FIG. 1 in FIGS. 2 and 3, and the vehicle seats 10 are shown only schematically, for which reason a number of features of the vehicle seat 10 shown in FIG. 1 are missing. FIG. 2 shows that the vehicle seats 10 are arranged in four passenger cabin rows 78, 80, 82, 84. The respective passenger cabin rows 78, 80, 82, 84 are each oriented parallel to the passenger cabin longitudinal direction 32. At the same time, two of the passenger cabin rows 78, 84 are each arranged at an edge of the passenger cabin 34 when viewed in relation to a passenger cabin transverse direction oriented perpendicular to the passenger cabin longitudinal direction 32. Passenger cabin rows 80, 82 are arranged in a center of the passenger cabin 34. Passenger cabin rows 80, 82 are each separated from passenger cabin rows 78 and 84, respectively, by a passenger cabin aisle 86. Each passenger cabin aisle 86 is oriented parallel to the passenger cabin longitudinal direction 32. The passenger cabin longitudinal direction 32 is oriented parallel to a direction of flight.

FIG. 2 shows a passenger cabin seat configuration referred to as 44 PAX. In the passenger cabin seat configuration referred to as 44 PAX, a total of 44 vehicle seats 10 are arranged in the passenger cabin 34. Thus, a total of eleven vehicle seats 10 is arranged in each of the four passenger cabin rows 78, 80, 82, 84. The respective seating device 12 of the respective vehicle seat 10 is installed in the passenger cabin 34 with a seat unit longitudinal direction 18 oriented in each case obliquely to the passenger cabin longitudinal direction 32. The respective seat unit longitudinal direction 18 of the respective seat unit 14 is in each case oriented inclined to the passenger cabin longitudinal direction 32. The respective seat unit longitudinal direction 18 of the respective seat unit 14 in each case encloses a smallest angle of 30° with the passenger cabin longitudinal direction 32. A respective lying surface longitudinal direction 88 oriented parallel to the respective lying surface longitudinal extent 66 in each case encloses a smallest angle of 30° with the passenger cabin longitudinal direction 32. A respective spacing between two vehicle seats 10 arranged one behind the other in relation to the passenger cabin longitudinal direction 32 is in each case about 97 cm in the passenger cabin seat configuration referred to as 44 PAX. The respective angles and spacings are variable and can be varied according to requirements and circumstances in a particular passenger cabin. Combinations that appear worthwhile to a person skilled in the art are conceivable here.

Further passenger cabin seat configurations are conceivable as an alternative to the passenger cabin seat configuration referred to as 44 PAX. In each of the passenger cabin seat configurations, the above-described angles between the respective seat unit longitudinal direction 18 and the passenger cabin longitudinal direction 32 and between the respective lying surface longitudinal direction 88 and the passenger cabin longitudinal direction 32 are the same as in the passenger cabin seat configuration referred to as 44 PAX. However, the respective spacings between the respective vehicle seats 10 vary according to the passenger cabin seat configuration. In a passenger cabin seat configuration referred to as 32 PAX, a respective spacing between two vehicle seats 10 arranged one behind the other in relation to the passenger cabin longitudinal direction 32 is in each case about 135 cm. In the passenger cabin seat configuration referred to as 32 PAX, a total of 32 vehicle seats 10 is arranged in the passenger cabin 34. Thus, a total of eight vehicle seats 10 is arranged in each of the four passenger cabin rows 78, 80, 82, 84.

In a passenger cabin seat configuration referred to as 36 PAX, a respective spacing between two vehicle seats 10 arranged one behind the other in relation to the passenger cabin longitudinal direction 32 is in each case about 120 cm. In the passenger cabin, seat configuration referred to as 36 PAX, a total of 36 vehicle seats 10 is arranged in the passenger cabin 34. Thus, a total of nine vehicle seats 10 is arranged in each of the four passenger cabin rows 78, 80, 82, 84. In a passenger cabin seat configuration referred to as 40 PAX, a respective spacing between two vehicle seats 10 arranged one behind the other in relation to the passenger cabin longitudinal direction 32 is in each case about 107 cm. In the passenger cabin seat configuration referred to as 40 PAX, a total of 40 vehicle seats 10 is arranged in the passenger cabin 34. Thus, a total of ten vehicle seats 10 is arranged in each of the four passenger cabin rows 78, 80, 82, 84.

FIG. 3 shows an enlarged detail of FIG. 2. The enlarged detail of FIG. 2 is thus designed as a section of the passenger cabin seat configuration referred to as 44 PAX. Moreover, FIG. 3 shows a system 62 according to the invention having the vehicle seat 10 according to the invention and having a further seat 64 arranged behind vehicle seat 10 in relation to the seat unit longitudinal direction 18, more specifically having a further vehicle seat 10 arranged behind vehicle seat 10 in relation to the seat unit longitudinal direction 18.

As can be seen clearly particularly in FIG. 3, the two bench unit surfaces 22, 38 of the two bench units 16, each have five corners when viewed in a plan view. Moreover, FIG. 3 shows clearly that—as already mentioned—each seating device 12 has the partition wall 54, which in each case has an undulating contour in one cross-sectional plane in each case.

It is conceivable for the two bench units 16, 36 and the seat unit 14 to be mounted so as to be movable. More specifically, it is conceivable for a respective angle between the respective bench unit surface 22, 38 and a floor and an angle between the seat bottom unit 24 and the floor to be of variable configuration. It is likewise conceivable for the respective bench unit surface 22, 38 and the seat bottom unit 24 to form a Z-shaped profile in one seat position. More specifically, it is conceivable for the Z-shaped profile to be set by the passenger sitting on the seating device 12. This Z-shaped profile is referred to as the lazy-Z position. It is furthermore conceivable for the seat position referred to as the lazy-Z position to be set by means of the seat unit 14 of pivotable design. More specifically, it is conceivable for the seat position referred to as the lazy-Z position to be set by means of a combined pivoting movement of the seat bottom unit 24, of the lower leg support unit 44 and of the backrest unit 58. It is conceivable here for the Z-shaped profile to be set by the passenger sitting on the seating device 12.

REFERENCE SIGNS 10 vehicle seat
12 seating device
14 seat unit
16 bench unit
18 seat unit longitudinal direction
20 transverse direction
22 bench unit surface
24 seat bottom unit
26 lying surface
28 cavity
30 seating device
32 passenger cabin longitudinal direction
34 passenger cabin
36 bench unit
38 bench unit surface
40 bench unit longitudinal extent
42 seat unit longitudinal extent
44 lower leg support unit
46 bench unit longitudinal extent
48 seat unit longitudinal extent
50 transverse extent
52 transverse extent
54 partition wall
56 bench unit region
58 backrest unit
60 side guide member
62 system
64 seat
66 lying surface longitudinal extent
68 lower leg support unit surface
70 cavity
72 bench unit front region
74 bench unit longitudinal direction
76 bench unit longitudinal direction
78 passenger cabin row
80 passenger cabin row
82 passenger cabin row
84 passenger cabin row
86 passenger cabin aisle
88 lying surface longitudinal direction
90 bench unit transverse extent
92 bench unit transverse extent
94 bench unit rear region

The invention claimed is:

1. A vehicle seat, in particular an aircraft seat for a passenger, the vehicle seat comprising:
at least one seating device the seating device has at least one seat unit and at least one bench unit;
the bench unit is arranged at one side of the seat unit in a transverse direction, the transverse direction is oriented at least substantially perpendicular to a seat unit longitudinal direction of the seat unit,
the bench unit has a bench unit surface which, together with at least one seat bottom unit of the seat unit in at least one seat position of the seat unit, forms a lying surface for the passenger,
the bench unit has at least one cavity, the at least one cavity of the bench unit is provided in the at least one seat position of the seat unit, the at least one cavity of the bench unit has an opening that faces an other seating device arranged behind said seating device, the at least one cavity is adapted to accommodate, through the opening, the legs of another passenger when seated, in relation to the seat unit longitudinal direction, in the other seating device arranged behind said seating device.

2. The vehicle seat according to claim 1, wherein the seating device is provided for installation in a passenger cabin with the seat unit longitudinal direction oriented inclined to a passenger cabin longitudinal direction.

3. The vehicle seat according to claim 2, wherein the seating device has at least one further bench unit, which is formed separately from said bench unit and is arranged at a side of the seat unit arranged separately from the first side in relation to the transverse direction.

4. The vehicle seat according to claim 2, wherein the bench unit has a bench unit longitudinal extent which is at least substantially the same as a seat unit longitudinal extent of the seat unit in at least one seat position.

5. The vehicle seat according to claim 2, wherein the seat unit has at least one lower leg support unit and the at least one seat bottom unit, which are arranged at least substantially in one plane in at least one seat position.

6. The vehicle seat according to claim 2, wherein the seat unit has at least two different transverse extents in the transverse direction.

7. The vehicle seat according to claim 2, wherein the seating device has at least one partition wall, which has an at least substantially undulating contour in at least one cross sectional plane.

8. The vehicle seat according to claim 2, wherein the bench unit has at least one bench unit region which is oriented at least substantially parallel to a backrest unit of the seat unit in at least one seat position.

9. The vehicle seat according to claim 1, wherein the seating device has at least one further bench unit, which is formed separately from said bench unit and is arranged at a side of the seat unit arranged separately from the first side in relation to the transverse direction.

10. The vehicle seat according to claim 9, wherein the further bench unit has a bench unit surface which forms the lying surface with the seat bottom unit of the seat unit and with the bench unit surface of the bench unit in at least one seat position.

11. The vehicle seat according to claim 9, wherein the seat unit has at least one lower leg support unit and the at least one seat bottom unit, which are arranged at least substantially in one plane in at least one seat position, and the further bench unit has a bench unit longitudinal extent which is at least substantially the same as a seat unit longitudinal extent of the seat unit in the seat position in which the lower leg support unit and the seat bottom unit are arranged at least substantially in said plane.

12. The vehicle seat according to claim 1, wherein the bench unit has a bench unit longitudinal extent which is at least substantially the same as a seat unit longitudinal extent of the seat unit in at least one seat position.

13. The vehicle seat according to claim 1, wherein the seat unit has at least one lower leg support unit and the at least one seat bottom unit, which are arranged at least substantially in one plane in at least one seat position.

14. The vehicle seat according to claim 1, wherein the seat unit has at least two different transverse extents in the transverse direction.

15. The vehicle seat according to claim 1, wherein the seating device has at least one partition wall, which has an at least substantially undulating contour in at least one cross sectional plane.

16. The vehicle seat according to claim 1, wherein the bench unit has at least one bench unit region which is oriented at least substantially parallel to a backrest unit of the seat unit in at least one seat position.

17. The vehicle seat according to claim 1, wherein the seat unit comprises at least one backrest unit, which comprises at least one side guide member.

18. A system having at least one vehicle seat according to claim 1 and having at least one further seat arranged behind said vehicle seat in relation to the seat unit longitudinal direction, in particular having at least one further vehicle seat according to claim 1 arranged behind said vehicle seat in relation to the seat unit longitudinal direction.

19. A passenger cabin, in particular an aircraft passenger cabin, having at least one vehicle seat according to claim 1.

20. The passenger cabin according to claim 19, wherein the seating device is installed in the passenger cabin with a seat unit longitudinal direction oriented inclined to the passenger cabin longitudinal direction.

\* \* \* \* \*